United States Patent
Necklas

(10) Patent No.: US 11,782,292 B2
(45) Date of Patent: Oct. 10, 2023

(54) EYEWEAR RETENTION DEVICE

(71) Applicant: Christopher Necklas, Boston, MA (US)

(72) Inventor: Christopher Necklas, Boston, MA (US)

(73) Assignee: Christopher Necklas, Boston, MA (US)

( * ) Notice: Subject to any disclaimer, the term of this patent is extended or adjusted under 35 U.S.C. 154(b) by 102 days.

(21) Appl. No.: 17/560,399

(22) Filed: Dec. 23, 2021

(65) Prior Publication Data

US 2022/0113556 A1 Apr. 14, 2022

Related U.S. Application Data

(63) Continuation of application No. 15/046,745, filed on Feb. 18, 2016, now Pat. No. 11,209,666.

(60) Provisional application No. 62/121,101, filed on Feb. 26, 2015.

(51) Int. Cl.
  *G02C 3/00* (2006.01)
(52) U.S. Cl.
  CPC .................................. *G02C 3/006* (2013.01)
(58) Field of Classification Search
  CPC . G02C 3/006; G02C 3/00; G02C 5/14; G02C 5/146; G02C 5/143
  See application file for complete search history.

(56) References Cited

U.S. PATENT DOCUMENTS

| | | | | |
|---|---|---|---|---|
| 2,481,946 | A | * 9/1949 | Pendleton | G02C 3/003 24/114.5 |
| 4,976,531 | A | 12/1990 | Kahaney | |
| 5,655,264 | A | * 8/1997 | Davancens | G02C 11/00 24/3.1 |
| 6,899,423 | B1 | * 5/2005 | Brazell | G02C 3/003 351/156 |
| 7,213,916 | B1 | * 5/2007 | Pettett | A61F 11/12 351/158 |
| 8,523,351 | B1 | 9/2013 | Cheong | |
| 9,164,293 | B2 | * 10/2015 | Farnam | G02C 5/20 |
| D774,591 | S | * 12/2016 | Businger | D16/339 |
| 2004/0083540 | A1 | * 5/2004 | Dondero | A61F 9/027 2/436 |
| 2013/0314298 | A1 | * 11/2013 | Stokes | G02C 3/006 345/1.1 |

(Continued)

*Primary Examiner* — Christopher Stanford
*Assistant Examiner* — Journey F Sumlar
(74) *Attorney, Agent, or Firm* — Occhiuti & Rohlicek LLP

(57) ABSTRACT

An eyewear retention apparatus is configured for use with an eyeglass frame having a pair of temples, each temple having a first extremity configured to attach to a lens holder and a second extremity configured to rest behind an ear of a wearer. The eyewear retention apparatus includes a strap formed of a flexible material and having a length extending between first and second ends, wherein each of the first and second ends includes a first hole extending through the strap. The eyewear retention apparatus also includes first and second fittings, each of the first and second fittings includes an end region having an opening configured to receive a respective one of the second extremity of the pair of temples and a tab having a second hole. The eyewear retention apparatus further includes a fastener extending through the first hole and the second hole.

20 Claims, 10 Drawing Sheets

(56) References Cited

U.S. PATENT DOCUMENTS

| | | | |
|---|---|---|---|
| 2014/0226122 A1* | 8/2014 | Terry | G02C 3/006 |
| | | | 351/157 |
| 2015/0277142 A1* | 10/2015 | Olsen | G02C 3/006 |
| | | | 351/178 |
| 2015/0370087 A1 | 12/2015 | Terreri | |
| 2016/0025997 A1* | 1/2016 | Yribarren | G02C 3/003 |
| | | | 351/156 |
| 2016/0025998 A1* | 1/2016 | Ruhland | G02C 3/006 |
| | | | 351/178 |
| 2016/0033787 A1 | 2/2016 | Relampagos | |

\* cited by examiner

EYEWEAR RETENTION DEVICE

CROSS-REFERENCE TO RELATED APPLICATIONS

This application is a continuation of U.S. application Ser. No. 15/046,745, filed Feb. 18, 2016, now U.S. Pat. No. 11,209,666, issuing Dec. 28, 2021, which claims priority benefit from Provisional Application No. 62/121,101, filed Feb. 26, 2015, the contents of which are herein incorporated by reference.

BACKGROUND

This invention relates to the design and manufacturing of eyewear retention devices.

Referring to FIGS. 1A and 1B, conventional eyewear retention devices are generally made from a single piece of rubber-like (e.g., neoprene) material 12 that is stitched at the ends 13 to form slots 14 to receive the eyewear temples 8 and secure the eyewear retention strap 12 to the eyewear frame temples 8. Retention devices made in this way do not work as well when low-stretch and/or low-grip materials such as cotton, nylon, polyester or leather are used. Such materials do not stretch as well to fit eyewear temples 8 of varying sizes and/or will not grip well to the eyewear temples 8. This causes the eyewear retention strap 12 to be prone to sliding off of the eyewear temples 8. Such retention devices are also bulkier on the eyewear temples 8 and can cause varying degrees of ergonomic discomfort depending on the thickness of the eyewear retention strap material 12.

Referring to FIG. 2, other conventional eyewear retention devices utilize rubber/plastic tube pieces 11 at the ends of cotton or similar eyewear retention strap 9. The eyewear retention strap material 9 is wrapped around the tube pieces 11 with the tubes 11 secured in place at the ends of the eyewear retention strap 9 with either stitching 10A or rivets 10B securing the eyewear retention strap material 9 to itself to close off the area where the tubes 11 have been inserted. The eyewear retention strap material 9 wrapping the tubes 11 adds bulk to the tubes 11 causing varying degrees of ergonomic discomfort at the point of contact between the eyewear temples 8 and the wearer's head. The material 9 wrapping the tubes 11 also reduces the grip of the tubes 11, which causes the amount of the eyewear temple 8 that needs to be inserted into the tubes 11 to be greater than is necessary with a higher grip material. This causes further ergonomic discomfort for the wearer of the eyewear frames.

SUMMARY

In a general aspect of the invention, an eyewear retention apparatus is configured for use with an eyeglass frame having a pair of temples, each temple having a first extremity configured to attach to a lens holder and a second extremity configured to rest behind an ear of a wearer. The eyewear retention apparatus includes a strap formed of a flexible material and having a length extending between a first end and a second end, wherein each of the first end and the second end includes a first hole extending through the strap. The eyewear retention apparatus includes a first fitting and a second fitting, each of the first fitting and the second fitting including an end region having an opening configured to receive a respective one of the second extremity of the pair of temples; and a tab having a second hole. The eyewear retention apparatus includes a fastener extending through the first hole and the second hole.

Embodiments of this aspect of the invention may include one or more of the following features. The fastener includes a cylindrical shaft having an elongated portion with a first diameter smaller than a second diameter of the second hole and a headed portion at a first end of the cylindrical shaft having a third diameter larger than the first diameter. The eyewear retention apparatus includes a cap sized and configured to cover a second end of the cylindrical shaft. In some embodiments, the cap is sized and configured to provide a friction fit with the shaft. The strap may be formed of cotton, nylon, polyester, leather. In embodiments, the first holes are smaller than diameter of cylindrical shaft. The fastener may include a rivet, button stud, cord, thread or string to retain the retention strap.

In certain embodiments, the strap includes two holes and the strap is configured to be folded in half length-wise such that the holes are coaxial. In other embodiments, the strap includes three holes in a Y configuration and strap is folded such that the three holes are coaxial.

Among other advantages an eyewear retention device of the present invention allows for the use of low-stretch, low-grip materials such as cotton, leather, nylon and polyester for the retention strap material while still providing a secure grip to the eyewear temples through the use of a rubber fitting directly connected to the retention strap at one end and eyewear temple at the other. These rubber fittings also minimize ergonomic discomfort for the wearer by adding the smallest possible amount of additional material to the ends of the eyewear temples. This is achieved through minimizing the wall thickness of the rubber fittings and ensuring they grip tightly enough to the eyewear temples that they only need to be attached to the very ends of the eyewear temples. Utilizing a hole or holes in the retention strap and a hole or holes in the rubber fittings ensures these two parts are able to be secured to one another in a manner that is operationally efficient for manufacturing at high volumes and durable enough to withstand daily wear through the use of a rivet, button stud, string, thread or cord assembly piece (as opposed to glue, heat shrink and/or another less secure and more time-intensive assembly method).

Other features and advantages of the invention are apparent from the following description, and from the claims.

DETAILED DESCRIPTION

Figure 1A:
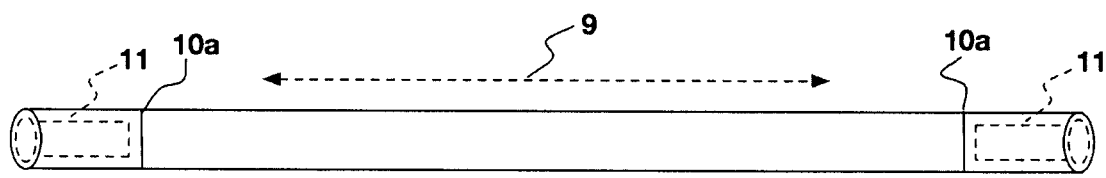
FIG. 1A is a schematic overview showing an example of a conventional eyewear retention device utilizing a piece of rubber/plastic tubing at each end which is wrapped in the eyewear retention strap material and secured with stitching.
Figure 1B:
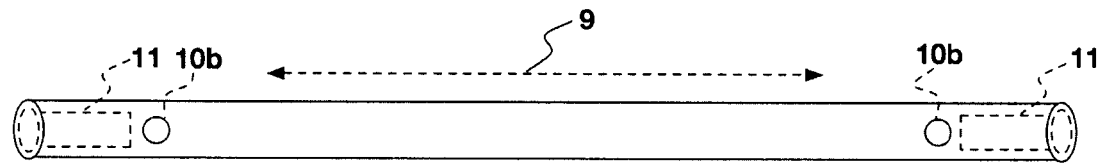
FIG. 1B is a schematic overview of a conventional eyewear retention device as shown in FIG. 1A utilizing rivets instead of stitching to hold the rubber/plastic tubing at the ends of the eyewear retention strap material.
Figure 2:
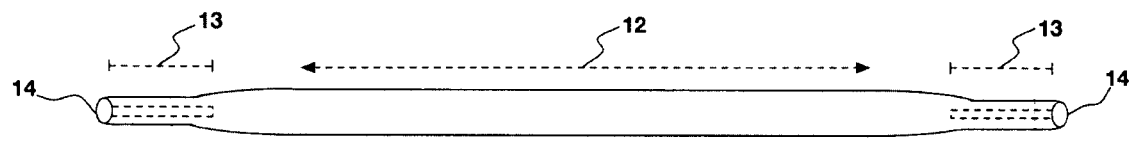
FIG. 2 is a schematic overview showing an example of a conventional eyewear retention device utilizing a single piece of material that is stitched at its ends.

Preferred embodiments of the present invention will be explained hereinafter in detail with reference to the accompanying drawings.

Referring to FIGS. 3, 4, 5A, 5B, 6A and 6B, an eyewear retention strap 6 includes a single hole 7 at each end. The eyewear retention strap 6 may be made from cotton, nylon, polyester, leather or any other similar material. The eyewear retention strap 6 is sized so that it is long enough to comfortably retain the wearer's eyewear frames while hanging from the back of the neck when they are not actively wearing the eyewear to shield their eyes.

Low-profile rubber fittings 1a contain a single tab 18 with a hole 3 to receive a male rivet end 5. The hole 3 is smaller than the shaft of the male rivet to account for the stretchiness of the rubber material that the rubber fitting 1a is made from. The rubber fitting 1a may be made from Neoprene, EPDM, Silicone, Latex or other similar or custom rubber formulation. The hole 3 stretches to fit the rivet shaft 5 and in doing so the amount beyond the size of the rivet shaft 5 that it will be able to stretch is minimized. This makes for a more secure attachment between the rubber fitting 1a and the male rivet shaft 5. The holes 3 in the rubber fittings 1a are incorporated in the design of the molds used to create the rubber fittings 1a. In doing so, the holes 3 do not contain abrasions that might be caused by puncturing the holes 3 post-manufacturing of the rubber fittings 1a which would make them prone to ripping. The male rivet shaft 5 is pressed through the hole 3 in the rubber fitting 1a tab 18. The male rivet shaft 5 with the rubber fitting 1a now attached is then pressed through the hole 7 in the retention strap 6 (these steps may be reversed). The connection is then secured by the female rivet cap 4 which is pressed into the end of the male rivet shaft 5 fastening the rubber fitting 1a and retention strap 6 together. It is important that the male rivet shaft 5 is long enough to accommodate the material of the rubber fitting 1a tab 18 and the retention strap 6 and receive the female rivet cap 4.

Figure 3:
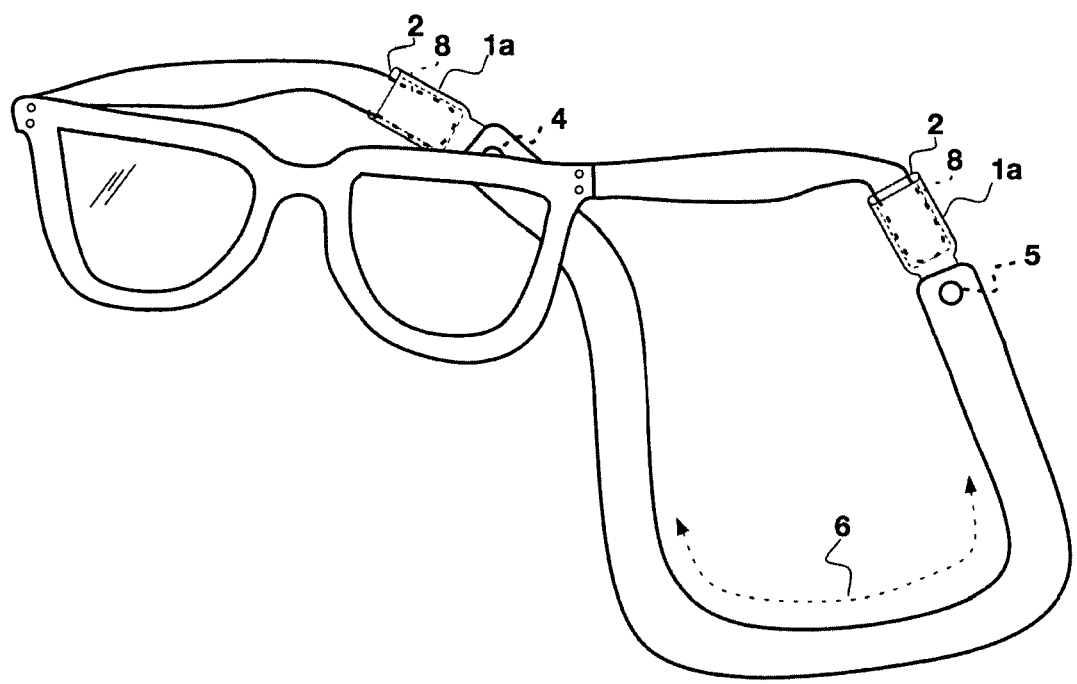
FIG. 3 is a schematic overview of an eyewear retention device according to an embodiment of the present invention and the way at which it connects to eyewear frame temples.
Figure 4:
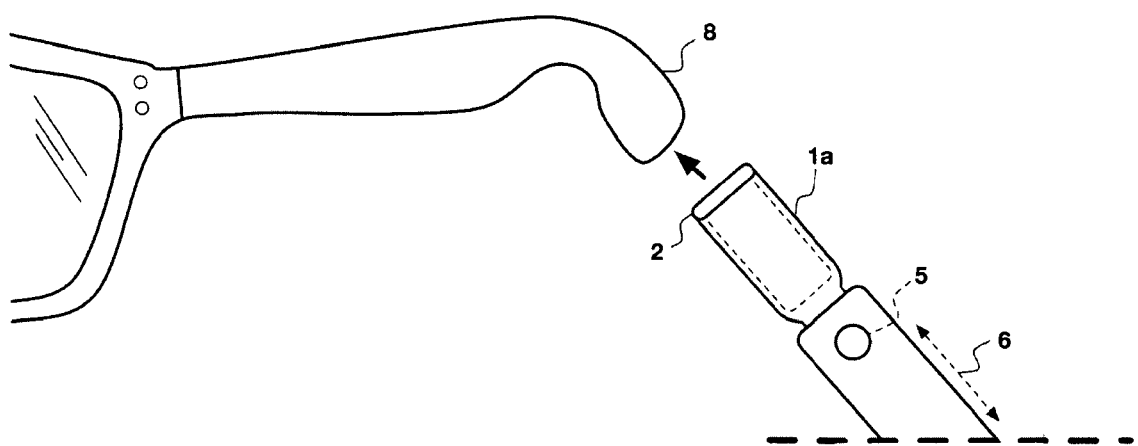
FIG. 4 is a schematic detail side view of an eyewear retention device shown in FIG. 3 and how it connects to the eyewear frame temple.
Figure 5A:
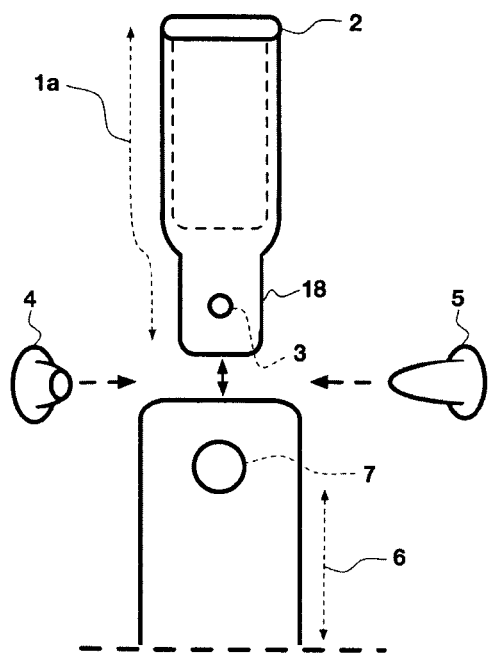
FIG. 5A is a schematic front view of the disassembled end portion of an eyewear retention device according to an embodiment of the present invention utilizing one hole in the eyewear retention strap material, a single tab rubber fitting and a rivet assembly.
Figure 5B:
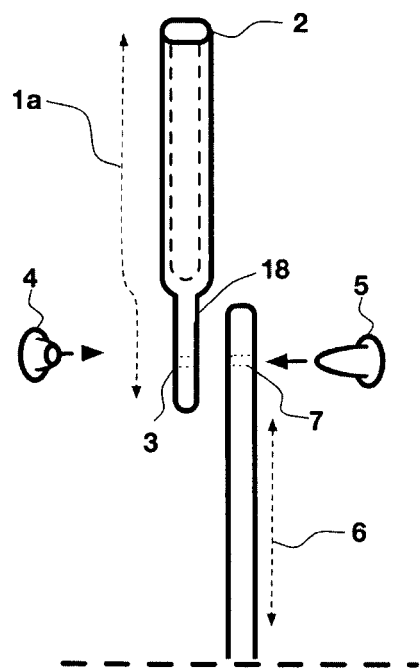
FIG. 5B is a schematic side view of the disassembled end portion of an eyewear retention device shown in FIG. 5A.
Figure 6A:
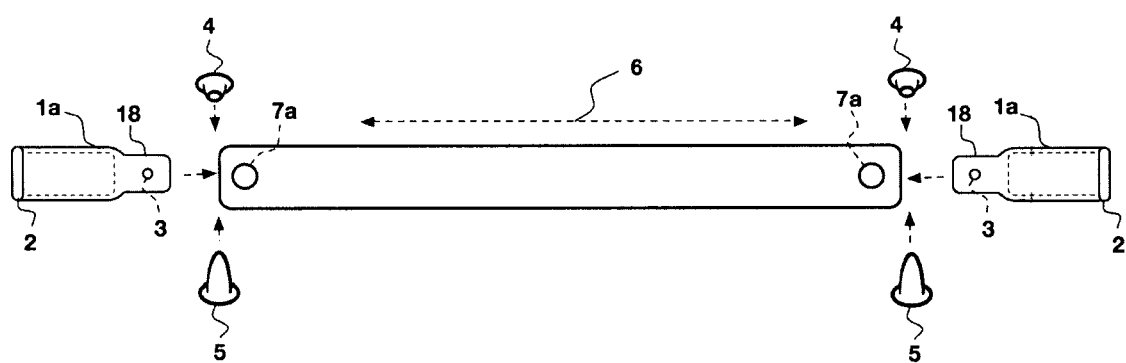
FIG. 6A is a schematic overview of a disassembled eyewear retention device according to an embodiment of the present invention utilizing one hole at each end of the eyewear retention strap material, single tab rubber fittings and rivet assembly.
Figure 6B:
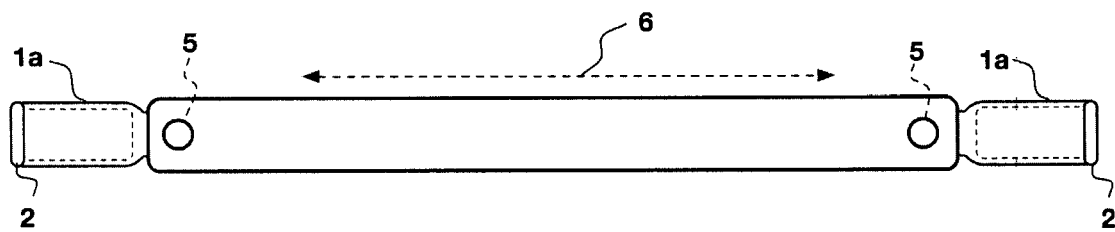
FIG. 6B is a schematic overview of an assembled eyewear retention device as it is shown in FIG. 6A.

The rubber fittings 1a contain a slot 2 to receive eyewear temples 8 as shown in FIGS. 3 and 4. These slots 2 are sized to stretch to fit eyewear temples 8 of varying sizes. The slots 2 are in the top portion of the rubber fitting 1a and stop before the tab 18 on the bottom portion of the rubber fitting 1a. The tab 18 of the rubber fitting 1a is solid (aside from the hole 3). The slots 2 to receive the eyewear temples 8 are illustrated with an oval shaped entry point but this entry point could also be circular. The slots 2 allow the eyewear temples 8 to be slid into the rubber fittings 1a. The eyewear temples 8 are long stems on each side of the eyewear frame that typically bend downward behind the ears of the wearer. It is at the very ends of the eyewear temples 8 that the rubber fittings 1a are attached. The rubber fittings 1a are manufactured with thin walls surrounding the slots 2 to minimize ergonomic discomfort that would be added to the eyewear temples 8 since the eyewear temples 8 are formed to follow the shape of the head behind the ears of the wearer.

Referring again to FIGS. 3, 4, 5A, 5B, 6A and 6B, the eyewear retention strap 6 is connected to the rubber fittings 1a through the use of a single hole 7 in the retention strap 6. There are additional ways to form this connection through the use of multiple holes 7 in the retention strap 6

Figure 7:
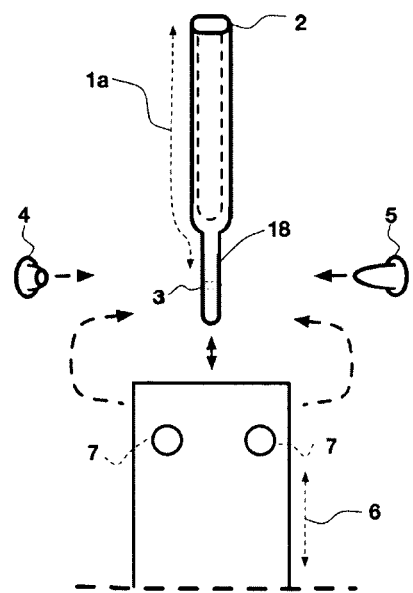
FIG. 7 is a schematic side view of the disassembled end portion of an eyewear retention device according to an embodiment of the present invention utilizing two holes at each end of the eyewear retention strap material, a single tab rubber fitting and rivet assembly.

For example, in FIG. 7, an eyewear retention strap 6 is shown with two holes 7 instead of one. The two holes 7 are each the same size and are spaced apart from one another left to right with enough space in the middle for the retention strap 6 to be folded in half length-wise at each end allowing the end of the retention strap 6 to wrap around the tab 18 of the rubber fitting 1a. The two holes 7 in the retention strap 6 are spaced so that when wrapped around the tab 18 they align on each side with the hole 3 in the tab 18. The male rivet shaft 5 is then pressed through the first hole 7 in the retention strap 6 followed by the hole 3 in the rubber fitting 1a and finally the second hole 7 in the retention strap 6 and capped with a female rivet cap 4 to secure the attachment. This is done at both ends of the retention strap 6. This method utilizing two holes 7 allows for the retention strap 6 to drape more naturally from the ends of the eyewear temples 8.

Figure 8A:
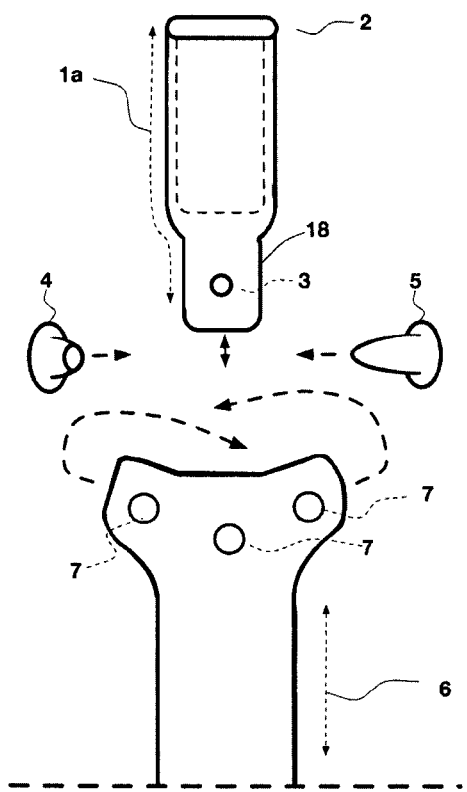
FIG. 8A is a schematic front view of the disassembled end portion of an eyewear retention device according to an embodiment of the present invention utilizing three holes at each end of the eyewear retention strap material, a single tab rubber fitting and rivet assembly.
Figure 8B:
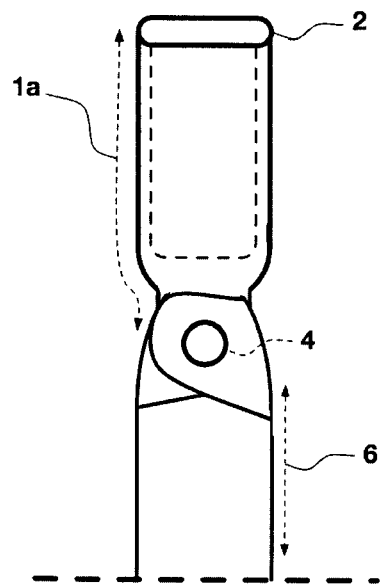
FIG. 8B is a schematic rear view of the disassembled end portion of an eyewear retention device shown in FIG. 8A.

In another example, as shown in FIG. 8A, a dissembled end portion of the eyewear retention device is shown utilizing three holes 7 at each end of the retention strap 6. In this design the end of the eyewear retention strap 6 resembles a "Y" configuration in which two flaps off the sides of the end of the retention strap 6 are wrapped around the tab 18 of the rubber fitting 1a and folded in such a way that the holes 7 in the retention strap align with the hole 3 in the rubber fitting 1a (as shown in FIG. 8B). All three holes 7 are the same size and one hole 7 is in the middle of the end of the retention strap 6 with the other two holes 7 each on one of the flaps in the "Y" configuration. A male rivet shaft 5 is pressed through the first hole 7 in the middle of the end of the retention strap 6 followed by the hole 3 in the tab 18 of the rubber fitting 1a, followed by the second hole 7 in one of the side flaps of the retention strap 6 that has been folded over to cover the back of the tab 18 and then the third hole 7 in the other flap of the retention strap 6 that is folded over on top of the first flap. The closure is capped off with a female rivet cap 4 to secure the attachment. This method utilizing three holes 7 provides for the tab 18 of the rubber fitting 1a to be wrapped on four of six sides by the retention strap 6.

Figure 9:
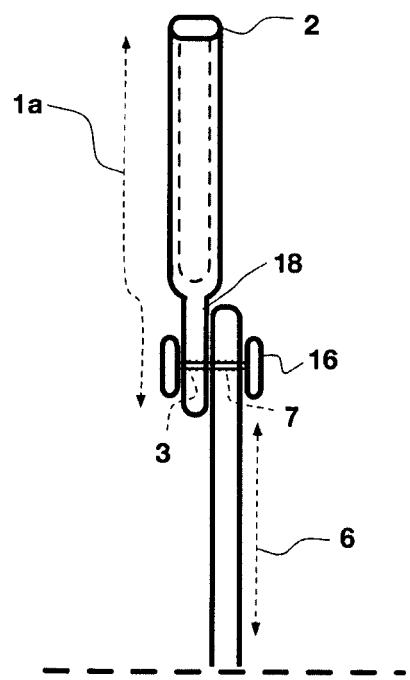
FIG. 9 is a schematic side view of the disassembled end portion of an eyewear retention device shown in FIG. 5B using a button stud assembly instead of a rivet assembly.

Referring to FIGS. 3, 4, 5A, 5B, 6A, 6B, 7, 8A and 8B, the eyewear retention device is shown with a rubber fitting 1a that is secured to the eyewear retention strap 6 through the use of a rivet (4, 5). Other fasteners that may be used include a button stud 16, as shown in FIG. 9. The button stud 16 connects the retention strap 6 to the rubber fitting 1a utilizing a shaft and two end caps similar to that of the rivet fastener (4, 5). The advantage of the button stud 16 is that unlike the rivet (4, 5) whose caps are usually permanently attached to the shaft once set, the button stud 16 may have a cap on one or both ends that unscrews, or disconnects in some other fashion, from the shaft. This allows the retention strap 6 to be easily disconnected from the rubber fittings 1a. In doing so, the rubber fittings 1a can be left attached to the eyewear temples 8 and the retention strap 6 may be connected when it is needed and disconnected when it is not. This may be simpler for the wearer than removing the rubber fittings 1a that tend to grip very tightly to the eyewear temples 8. This also provides the ability to interchange different eyewear retention straps 6 onto the same rubber fittings 1a. The wearer may want to interchange eyewear retention straps 6 because they are different sizes, materials, colors or patterns.

Figure 10:
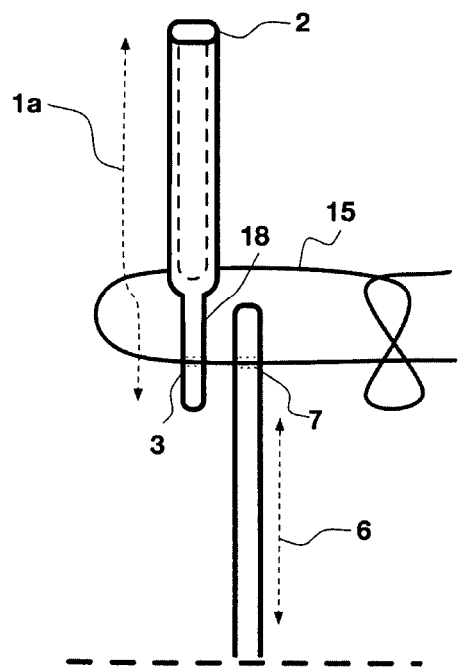
FIG. 10 is a schematic side view of the disassembled end portion of an eyewear retention device shown in FIG. 5B using a thread, string or cord assembly instead of a rivet assembly.

As shown in FIG. 10, a cord, thread or string 15 may also be used to connect the rubber fitting 1a to the retention strap 6, instead of a rivet 4, 5 or button stud 16. The cord, thread or string 15 is sewn through the hole(s) 7 in the retention strap 6 and the hole 3 in the rubber fitting 1a. The cord or string 15 is then tied to secure the connection. This method may be beneficial because the cord, thread or string 15 is lighter in weight than the rivet 4, 5 or button stud 16. The cord, thread or string 15 is also most likely to have a lower material cost than the rivet 4, 5 or button stud 16. The cord, thread or string 15 might also be chosen simply for aesthetic reasons.

In FIGS. 3, 4, 5A, 5B, 6A, 6B, 7, 8A, 8B, 9 and 10 the eyewear retention device is shown with a rubber fitting 1a that is of a single-tab 18 design.

Figure 11:
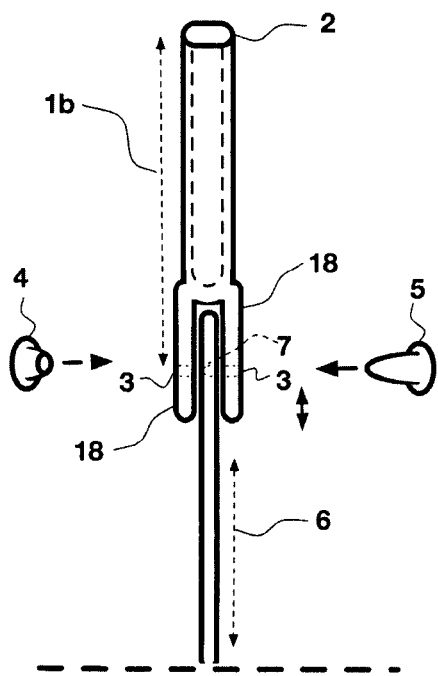
FIG. 11 is a schematic side view of the disassembled end portion of an eyewear retention device shown in FIG. 5B using a double-tab rubber fitting instead of a single-tab rubber fitting.

Referring to FIG. 11, an alternative embodiment of the eyewear retention device the rubber fitting 1b has a double-tab 18 design. The two tabs 18 protrude from the bottom of the rubber fitting 1b and are symmetrical in design. Each tab has a hole 3 to receive a fastener to secure the rubber fitting 1b to a retention strap 6. The tabs 18 are spaced apart from each other so that there is a gap large enough for the retention strap 6 to be inserted. In this embodiment, the eyewear retention strap 6 is positioned between the two tabs 18 of the rubber fitting 1b so that the hole 7 in the retention strap 6 aligns with the holes 3 in each tab 18 of the rubber fitting 1b. The fastener, which may include the rivet 4, 5, button stud 16, cord, thread or string 15, as previously described, is then affixed through the hole 3 in the rubber fitting 1b followed by the hole 7 in the retention strap 6 and lastly the second hole 3 in the rubber fitting 1b. This configuration allows for a symmetrical appearance on both sides of the eyewear retention device.

Figure 12:
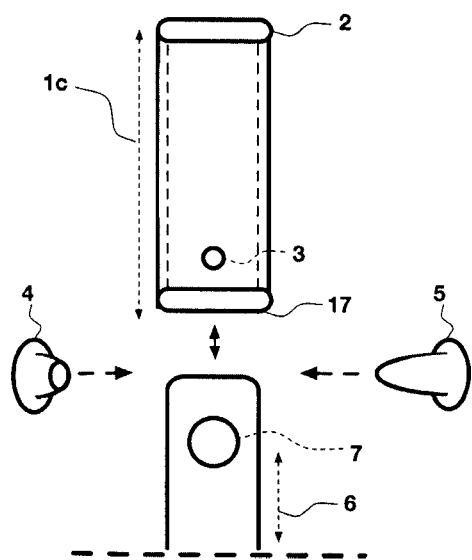
FIG. 12 is a schematic side view of the disassembled end portion of an eyewear retention device shown in FIG. 5A using a dual-entry rubber fitting instead of a single-tab rubber fitting.

Referring to FIG. 12, an additional embodiment of the eyewear retention device includes a rubber fitting 1c having a dual-entry design. With this embodiment, the rubber fitting 1c has a hole 2 at the top end and a hole 17 at the bottom end, forming a hollow tube. There is no tab 18. The rubber fitting has two holes 3 on opposite sides of the end containing the hole 17 to receive the retention strap 6. In this variation the retention strap 6 is slid inside the hole 17 so that the hole 7 in the retention strap aligns with the holes 3 in the rubber fitting 1c. A fastener as described previously is used to secure the retention strap 6 inside the rubber fitting 1c With respect to the embodiments shown in FIGS. 3, 4, 5A, 5B, 6A, 6B, 7, 8A, 8B, 9, 10, 11 and 12 the retention strap 6 is formed of a single piece of material. If the material used for the retention strap is not suited to contain hole(s) 3 then a secondary piece of material is attached to the ends of the retention strap 6. This secondary piece of material functions in the same ways the end of the retention strap 6 functions. This secondary piece of material is attached to the end of the retention strap 6 typically by stitching and/or glue. This secondary piece of material at the ends of the retention strap 6 may also be used for aesthetic reasons.

Figure 13A:
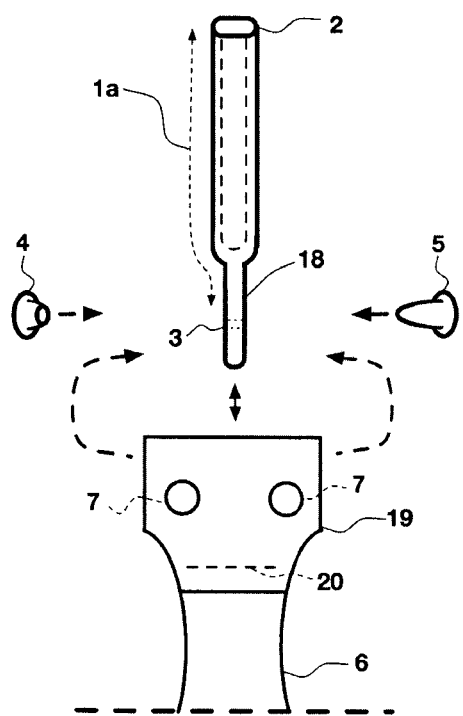
FIG. 13A is a schematic side view of the disassembled end portion of an eyewear retention device according to an embodiment of the present invention utilizing an additional piece of material attached to each end of the eyewear retention strap and two holes at the ends of the retention strap.
Figure 13B:
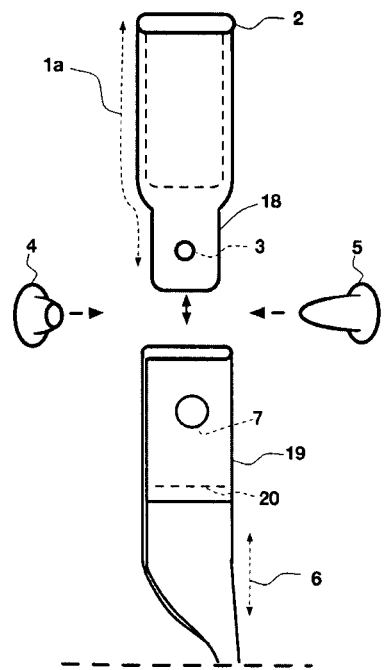
FIG. 13B is a schematic front view of the disassembled end portion of an eyewear retention device shown in FIG. 13A.

Referring to FIGS. 13A and 13B, a further embodiment of an eyewear retention device includes a retention strap 6 having an additional piece of material 19 at each end. The additional piece of material 19 is attached to each end of the retention strap 6. The additional piece of material 19 contains the hole(s) 7 to connect to the rubber fitting 1a through the use of a fastener 4, 5. The additional piece of material 19 is fastened to the retention strap 6 using stitching 20 and/or glue. In the two hole 7 design shown in FIGS. 13A and 13B the end of the retention strap 6 and the additional piece of material 19 are folded over the rubber fitting 1a so that the holes 7 align with the hole 3 in the tab 18. Additionally, where the additional piece of material 19 is attached to the retention strap 6 and folded it is stitched to keep it folded and to conceal the backside of the retention strap 6 where the additional piece of material 19 connects.

Figure 14A:
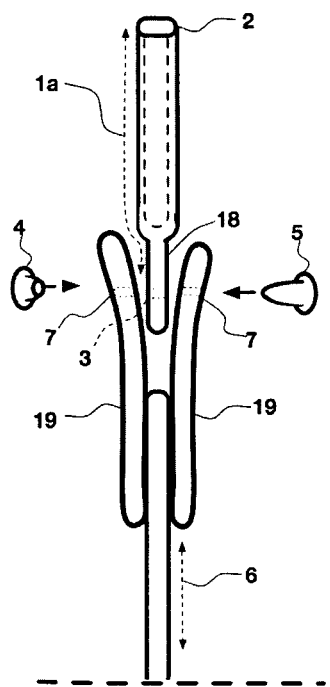
FIG. 14A is a schematic side view of the disassembled end portion of an eyewear retention device according to an embodiment of the present invention utilizing two additional pieces of material attached to each end of the eyewear retention strap.
Figure 14B:
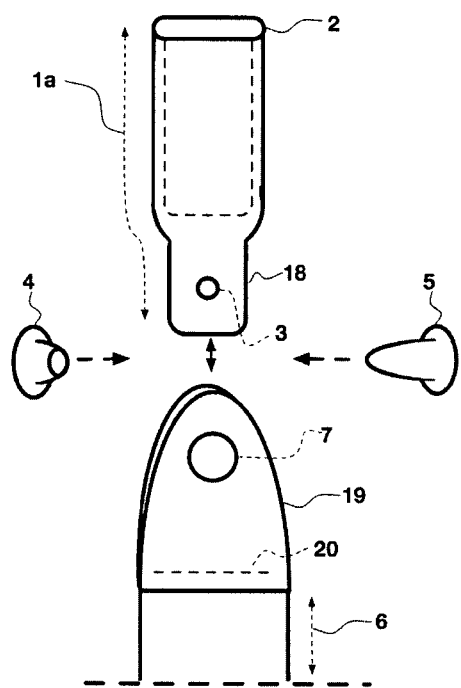
FIG. 14B is a schematic front view of the disassembled end portion of an eyewear retention device shown in FIG. 14A.

Referring to FIGS. 14A and 14B, an additional embodiment of an eyewear retention device includes a retention strap 6 having two additional pieces of material 19 at each end. The additional pieces of material 19 cap off the ends of the retention strap 6 and contains the hole(s) 7 to connect to the rubber fitting 1a, 1b or 1c through the use of a fastener 4, 5, 15, or 16. The additional pieces of material 19 are attached to the retention strap 6 using stitching 20 and/or glue at the very end of the retention strap 6.

As shown in FIGS. 14A & 14B, the eyewear retention device utilizes a single tab rubber fitting 1a and the two additional pieces of material 19 cover each side of the tab 18 of the rubber fitting 1*a* so that the holes 7 align with the hole 3 in the tab 18. In this example a rivet 4, 5 is used to secured the attachment.

Though the development of the present invention materials like cotton, nylon, polyester, leather and other similar types of low-stretch, low-grip materials may be used as eyewear retention straps 6 by attaching directly, or indirectly through the use of additional piece(s) of material 19, to rubber fittings 1*a*, 1*b*, 1*c* through the use of rivets 4, 5, cord, string or thread 15 or button studs 16 inserted through hole(s) 3 in the rubber fittings 1*a*, 1*b*, 1*c* and hole(s) 7 in the eyewear retention strap 6 or additional piece(s) of material 19. This manufacturing method provides a secure, economical, ergonomic, durable and fashionable attachment between the eyewear retention strap 6 and the rubber fitting 1*a*, 1*b*, 1*c* and between the rubber fitting 1*a*, 1*b*, 1*c* and the eyewear temples 8. This method provides a means from producing eyewear retention devices made from low-stretch and/or low-grip materials like cotton, nylon, polyester, leather or other similar materials.

It is to be understood that the foregoing description is intended to illustrate and not to limit the scope of the invention, which is defined by the scope of the appended claims. Other embodiments are within the scope of the following claims.

What is claimed is:

1. An apparatus comprising an eyewear-retention device for use with an eyeglass frame, said eyewear-retention device having
    a retention strap,
    a first double-tab fitting,
    a second double-tab fitting, a first fastener, and
    a second fastener,
    wherein the retention strap has a first end and a second end, each of the first and second ends having a hole,
    wherein the first double-tab fitting comprises a bottom and tabs that protrude from the bottom,
    wherein the tabs define a gap that receives the first end of the retention strap,
    wherein each of the tabs has a hole,
    wherein the second double-tab fitting comprises a bottom and tabs that protrude from the bottom,
    wherein the tabs define a gap that receives the first end of the retention strap,
    wherein each of the tabs has a hole,
    wherein the first fastener is affixed through the holes in the tabs of the first double-tab fitting and through the hole in the first end of the strap; and
    wherein the second fastener is affixed through the holes in the tabs of the second double-tab fitting and through the hole in the second end of the strap.

2. The apparatus of claim 1, wherein: the first fastener comprises a cylindrical shaft having an elongated portion with a first diameter smaller than a second diameter of the holes of the tabs of the first double-tab fitting and the second fastener comprises a cylindrical shaft having an elongated portion with a third diameter smaller than a fourth diameter of the holes of the tabs of the second double-tab fitting.

3. The apparatus of claim 1,
    wherein the first fastener comprises a cylindrical shaft having an elongated portion with a first diameter that is smaller than a second diameter of the holes of the tabs of the first double-tab fitting and a cap sized and configured to cover an end of the cylindrical shaft and
    wherein the second fastener comprises a cylindrical shaft having an elongated portion with a third diameter that is smaller than a fourth diameter of the holes of the tabs of the second double-tab fitting and a cap sized and configured to cover an end of the cylindrical shaft.

4. The apparatus of claim 1, further comprising first and second circular caps, wherein the first fastener comprises the first circular cap and the second fastener comprises the second circular cap.

5. The apparatus of claim 1,
    wherein the first double-tab fitting has a first width at a first distance from the holes of the tabs of the first double-tab fitting and has a second width at a second distance from the holes of the tabs of the first double-tab fitting,
    wherein the first width and the second width differ,
    wherein the first distance and the second distance differ,
    wherein the second double-tab fitting has a first width at a first distance from the holes of the tabs of the second double-tab fitting and has a second width at a second distance from the holes of the tabs of the second double-tab fitting, and
    wherein the first width and the second width differ, and
    wherein the first distance and the second distance differ.

6. The apparatus of claim 5, wherein the second distance of the first double-tab fitting is greater than the first distance of the first double-tab fitting, the second width of the first double-tab fitting is greater than the first width of the first double-tab fitting, the second distance of the second double-tab fitting is greater than the first distance of the second double-tab fitting, and the second width of the second double-tab fitting is greater than the first width of the second double-tab fitting.

7. The apparatus of claim 1,
    wherein the first double-tab fitting has a first width at a first distance from the bottom of the first double-tab fitting and has a second width at a second distance from the bottom of the first double-tab fitting,
    wherein the first width and the second width differ,
    wherein the first distance and the second distance differ,
    wherein the second double-tab fitting has a first width at a first distance from the bottom of the second double-tab fitting and has a second width at a second distance from the bottom of the second double-tab fitting,
    wherein the first width and the second width differ, and
    wherein the first distance and the second distance differ.

8. The apparatus of claim 7, wherein the second distance of the first double-tab fitting is greater than the first distance of the first double-tab fitting; the second width of the first double-tab fitting is greater than the first width of the first double-tab fitting; the second distance of the second double-tab fitting is greater than the first distance of the second double-tab fitting; and the second width of the second double-tab fitting is greater than the first width of the second double-tab fitting.

9. The apparatus of claim 1, wherein each tab of the first double-tab fitting has a rounded edge and wherein each tab of the second double-tab fitting has a rounded edge.

10. A method for affixing an eyewear retention strap to a first double-tab fitting and a second double-tab fitting, the method comprising inserting a first end of the eyewear retention strap through a first gap defined by tabs protruding from a bottom of the first double-tab fitting, affixing a first fastener through holes in the tabs of the first double-tab fitting and through a hole in the first end, inserting a second end of the eyewear retention strap through a second gap defined by tabs protruding from a bottom of the second double-tab fitting, and affixing a second fastener through holes in the tabs of the second double-tab fitting and through a hole in the second end.

11. The method of claim 10, wherein the first fastener comprises a cylindrical shaft having an elongated portion with a first diameter smaller than a second diameter of the holes of the tabs of the first double-tab fitting and a cap sized and configured to cover an end of the cylindrical shaft and wherein the second fastener comprises a cylindrical shaft having an elongated portion with a third diameter smaller than a fourth diameter of the holes of the second pair of tabs and a cap sized and configured to cover an end of the cylindrical shaft.

12. An apparatus comprising an eyewear-retention device for use with an eyeglass frame, the eyewear-retention device having a retention strap, a double-tab fitting, and a fastener, the retention strap having an end, the end having a hole, wherein the double-tab fitting comprises a bottom and tabs that protrude from the bottom, wherein the tabs define a gap that receives the end of the retention strap, wherein each of the tabs has a hole, and wherein the fastener is affixed through the holes in the tabs of the double-tab fitting and through the hole in the end of the strap.

13. The apparatus of claim 12, wherein each tab of the first double-tab fitting has a rounded edge.

14. The apparatus of claim 13, wherein the double-tab fitting has a first width at a first distance from the bottom and has a second width at a second distance from the bottom, wherein the first width and the second width differ, and wherein the first distance and the second distance differ.

15. The apparatus of claim 12, wherein the fastener comprises a cylindrical shaft having an elongated portion with a first diameter that is smaller than a second diameter of the holes of the tabs of the double-tab fitting.

16. The apparatus of claim 12, wherein the fastener comprises a cylindrical shaft having an elongated portion with a first diameter smaller than a second diameter of the holes of the tabs of first double-tab fitting and cap sized and configured to cover an end of the cylindrical shaft.

17. The apparatus of claim 12, wherein the fastener further comprises a circular cap.

18. The apparatus of claim 12, wherein the double-tab fitting has a first width at a first distance from the holes of the tabs and has a second width at a second distance from the holes of the tabs, wherein the first width and the second width differ, and wherein the first distance and the second distance differ.

19. The apparatus of claim 18, wherein the second distance is greater than the first distance and the second width is greater than the first width.

20. An apparatus comprising an eyewear retention apparatus for use with an eyeglass frame, the retention apparatus having a retention strap, a first fitting, a second fitting, a first fastener, and a second fastener, the retention strap having a first end and a second end, each of the first and second ends having a hole, wherein the first fitting is a dual-entry fitting that extends between first and second holes at corresponding first and second ends thereof, thereby forming a hollow tube through the first fitting, wherein the first hole at the first end of the first fitting receives the first end of the retention strap, wherein the first fitting further comprises third and fourth holes that align with the hole in the first end of the retention strap, wherein the first fastener is affixed through the third and fourth holes of the first fitting and through the hole in the first end of the retention strap, wherein the second fitting is a dual-entry fitting that extends between first and second holes at corresponding first and second ends thereof, thereby forming a hollow tube through the second fitting, wherein the first hole at the first end of the second fitting receives the second end of the retention strap, wherein the second fitting further comprises third and fourth holes that align with the hole in the second end of the retention strap, and wherein the second fastener is affixed through the third and fourth holes of the second fitting and through the hole in the second end of the retention strap.

* * * * *